United States Patent [19]
Williams et al.

[11] Patent Number: 5,815,682
[45] Date of Patent: Sep. 29, 1998

[54] DEVICE INDEPENDENT MODEM INTERFACE

[75] Inventors: Robert J. Williams, Kirkland; Christopher P. Caputo; Keith A. Laepple, both of Redmond, all of Wash.

[73] Assignee: Microsoft Corporation, Redmond, Wash.

[21] Appl. No.: 356,059

[22] Filed: Dec. 13, 1994

[51] Int. Cl.[6] ............................................. G06F 9/00
[52] U.S. Cl. .................... 395/500; 395/883; 395/884; 395/836; 364/238.5; 364/DIG. 1
[58] Field of Search ................................. 395/500, 882, 395/883, 884, 828, 603, 836, 831; 364/DIG. 1, 238.5; 379/219; 375/222

[56] References Cited

U.S. PATENT DOCUMENTS

| | | | |
|---|---|---|---|
| 3,754,217 | 8/1973 | Bell et al. ........................... | 340/172.5 |
| 4,292,669 | 9/1981 | Wollum et al. ...................... | 395/884 |
| 4,293,928 | 10/1981 | Baun .................................. | 395/884 |
| 5,038,320 | 8/1991 | Heath et al. ........................ | 364/900 |
| 5,202,899 | 4/1993 | Walsh ................................... | 375/8 |
| 5,202,963 | 4/1993 | Zelley ................................. | 395/325 |
| 5,459,867 | 10/1995 | Adams et al. ...................... | 395/700 |
| 5,530,887 | 6/1996 | Harper et al. ...................... | 395/800 |
| 5,530,895 | 6/1996 | Enstrom ............................. | 395/829 |
| 5,548,759 | 8/1996 | Lipe ................................... | 395/600 |
| 5,574,888 | 11/1996 | Panditji et al. ..................... | 395/500 |

FOREIGN PATENT DOCUMENTS 0 340 613  4/1989  European Pat. Off. .

OTHER PUBLICATIONS

Free, Gordon, "Programming with Communication Protocol Stacks", Dr. Dobb's Journal, Mar. 1992, V17, N3 p.72(8).
*IBM Technical Disclosure Bulletin,* IBM Corp. 1986, p. 2988.
"ProComm Plus for Windows User Guide", Mark Chambers et al., DataStorm Technologies, Inc., 1994, pp. 1–1 to 1–26.
"Modem MIB", Jim Barnes et al., Jan. 14, 1994, pp. 1–32.
"Inside the Macintosh Communications Toolbox", by Apple Computer, Inc., Addison–Wesley Publishing Company, Inc., 1991, pp. i–346.

*Primary Examiner*—Jacques H. Louis-Jacques
*Assistant Examiner*—Thai Phan
*Attorney, Agent, or Firm*—Klarquist Sparkman Campbell Leigh & Whinston LLP

[57] ABSTRACT

A device independent modem interface employs a call control and data transfer application programming interface for application programs to access a modem in a device independent fashion. A universal modem driver reads device specific information from a registry to issue specific control commands to a modem. The universal modem driver separates command mode and data mode of the modem transparently to the application. The modem interface also includes support for detecting a modem and for loading device specific information into the registry based on the modem identification.

18 Claims, 5 Drawing Sheets

DEVICE INDEPENDENT MODEM INTERFACE

FIELD OF THE INVENTION

The invention relates to computer communication using a modem, and more specifically, to a modem interface in a computer system.

BACKGROUND OF THE INVENTION

An increasing number of application programs ("applications") in today's personal computers must interact with a modem to support remote data communication features. Some examples of applications where access to a modem may be required include remote network access, bulletin board services, fax modem, electronic mail (e-mail) programs etc. Even applications such as word processing and spread sheet programs, for example, may include software for controlling a modem to transfer files to other computers. As access to a modem becomes an important feature of more applications, application developers have had to tackle the problem of developing code to support modem communication in their applications.

The task of controlling a modem complicates application development significantly. To control a modem, the application must understand the command set of the particular brand and version of modem connected to the computer. Many modems use commands from the Hayes Standard AT Command Set established by the Hayes Microcomputer Products, Inc. of Norcross, Ga. The AT command set includes a number of commands for controlling and configuring a modem that are well known and widely used in the computer industry. Each brand or version of modem, however, typically understands a unique combination of commands including some standard AT commands and additional commands to support new features. As a result, the command set supported in a modem can vary substantially.

To complicate matters further, there are number of protocols for modems and facsimile transmission established by the Comite Consultatif International de Telegraphie et Telephonie (CCITT), and the International Telecommunications Union—Telecommunications Standardization Sector (ITU-T). The application developer must be familiar with the AT commands as well as the modem protocols so that the application can properly control a modem.

With advances in modem technology, it is very difficult for application developers to create applications that will keep pace with changes in modem features. Each new feature is often supported with one or more new commands, which may vary with modem brands. In making an application compatible with a range of different modem features, the portion of the application devoted to modem support can become very complex. The development of this code obviously detracts from development of the core functions of an application. Even if a developer does a fairly thorough job of supporting current modem features, it is very likely that the modem support in an application will not support more advanced features of tomorrow's version of modems. After an application is released commercially, it is not possible to modify it easily to add support for advanced features.

Besides complicating application development, placing modem control in a number of applications causes a resource contention problem. When each application provides its own support for modem control, it is difficult, if not impossible, for applications to share the modem resource. Typically in these circumstances, the application that first gains control of the modem maintains control until it voluntarily relinquishes control. As a result, the application controlling the modem precludes other applications from participating in a telephone call. At best, an interface to the serial port driver can provide some contention management in this situation. This contention management is rather limited, however.

An additional drawback of existing modem support software is that they make modems difficult to install in the computer system. Applications can be set up to control more than one modem type, but they typically require additional information from the user to properly set up the application for communication with a particular modem type. It would be much easier for a user if the installation of modem specific information could be performed automatically.

SUMMARY OF THE INVENTION

To address the limitations and drawbacks of existing modem control systems, the invention provides a device independent modem interface. The invention includes a method for providing the device independent interface to a modem for applications running in a computer system.

According to an embodiment of the invention, the invention comprises a device independent modem interface included as part of a computer operating system. The interface includes a call control module for receiving call control commands and a communication driver for receiving data transfer commands from applications. Applications send call control and data transfer commands to the call control module and communication driver, respectively, in a device independent fashion. A universal modem driver provides device specific commands to a modem in response to instructions from the call control module. To understand the particular capabilities of a specific modem, the universal modem driver reads modem specific information from a registry data store. Using this information, the universal modem driver is able to use device specific commands for a number of modem types.

The universal modem driver separates the command mode and data mode of the modem transparently to the application. When the modem is in command mode, the universal modem driver transfers call control commands to the modem. When the modem is in data mode, the universal modem driver transfers data I/O commands from the communication driver to the modem.

The invention provides additional installation features. One embodiment of the invention includes a class installer module to load device specific control information into the registry data store. Some modem devices identify themselves to an enumerator detection module loaded for a bus in the computer system. During installation, a device identification can then be passed to the class installer module so that it can load the proper device information.

In situations where the modem cannot identify itself, another embodiment of the invention provides a method for detecting the modem type. This method includes issuing a series of queries to a modem, and then cleansing the modem's response so that device specific information can be derived. The response data can then be converted to a device identification, which is used to load device specific information.

The various embodiments of the invention provide several advantages over existing communication systems for computers. The invention makes the application developer's job much easier. The developer can use a simple, common interface to talk to a wide variety of devices. In one embodiment of the invention, the control of the modem may be broken into levels: at the top level, a control and communication application programming interface provides a device independent interface to a modem; at a lower level a universal modem driver can translate high level commands to commands for a specific type of modem, and finally at a lower level, a port driver can translate modem data and commands for a specific type of port.

After removing the task of modem control from the application, a modem control interface can perform resource contention more effectively.

The invention makes the user's job of installing and configuring a modem much easier. The user can simply plug in a modem, and the system will take care of the rest.

The universal modem driver eliminates the need for installing separate drivers for different types of modems. With a universal modem driver, modem specific information need only be loaded as needed. The installation of modem information can be performed without requiring the user to know what type of driver needs to be installed or how to install it.

DETAILED DESCRIPTION

Figure 1:
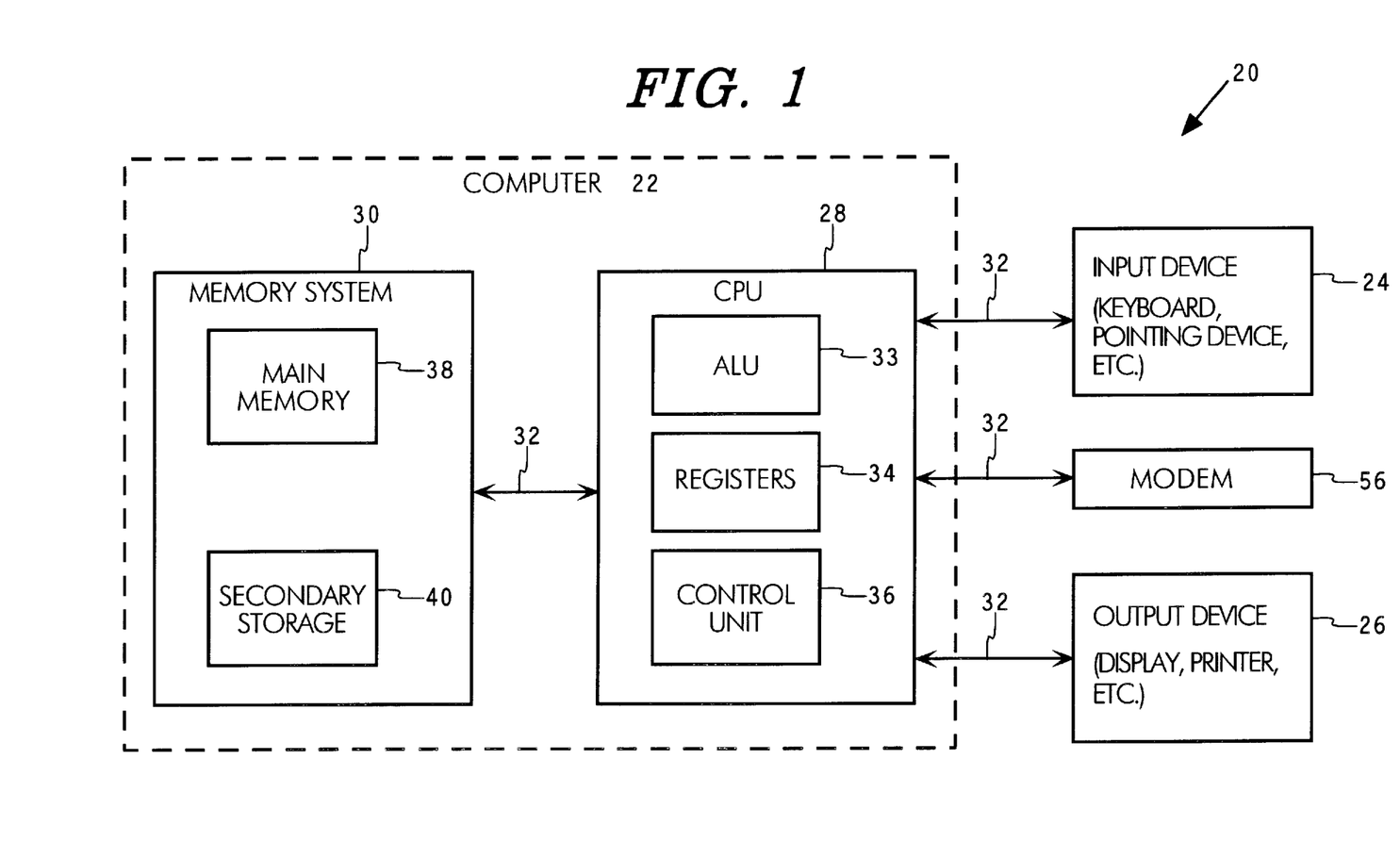
FIG. 1 is a block diagram of a computer system in which an embodiment of the invention is implemented.

FIG. 1 is a block diagram of computer system 20 in which an embodiment of the invention is implemented. Computer system 20 includes as its basic elements a computer 22, input device 24 and output device 26.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices and secondary storage 40 in the form of a medium such as floppy disks, hard disks, tape, CD-ROM, etc. and other devices that use optical or magnetic recording material. Main memory 38 stores programs such as a computer's operating system and currently running application programs. Main memory 38 also includes video display memory for displaying images through a display device.

Input device 24 and output device 26 are typically peripheral devices connected by bus structure 32 to computer 22. Input device 24 may be a keyboard, modem, pointing device, pen, or other device for providing input data to the computer. Output device 26 may be a display device, printer, sound device or other device for providing output data from the computer.

A modem 56 can serve as both an input and output device 24, 26. As an output device, the modem may receive commands and data from memory under the control of the programmed CPU. As an input device, the modem 56 can receive fax or computer data and transfer this data to memory for further processing or storage. The modem 56 can support data, fax, or voice calls, or even a combination of these types in a single call. If the computer system is coupled to a telephone, the computer can initiate a voice call by dialing the telephone number. The caller would then carry on voice communication through the handset of the phone once communication is established. For switched voice and data communication, the modem 56 can initiate a voice communication and establish communication between computers. It should be understood by those of ordinary skill in the industry that many modes of telephone communication through a modem are possible.

The process of physically transferring commands and data to the modem varies depending on the type of modem. Various standard modem configurations exist and are well-known in the field. These configurations include, for example, an internal or external modem, or a PCMCIA (Personal Computer Memory Card International Association) card connection popular in notebook computers. An "internal" modem is coupled to the computer through a bus structure 32 such as an Industry Standard Architecture (ISA) bus, Expanded Industry Standard Architecture (EISA) bus, or Micro Channel Architecture (MCA) bus. A modem can also be coupled to the bus structure 32 of the computer through a PCMCIA port. An "external" modem can be coupled to the bus structure 32 of the computer through an RS-232 serial port or a parallel port. As an additional example, a modem may be coupled to a local bus structure according to the PCI standard (Peripheral Component Interconnect, a local bus standard maintained by Peripheral Component Interconnect Special Interest Group). Many other variations are possible and are well-known to those of skill in the art.

It should be understood that FIG. 1 is a block diagram illustrating the basic elements of a general purpose computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which these parts of the CPU are integrated together, such as in a microprocessor. Moreover, the number and arrangement of the elements of the computer system may be varied from what is shown and described in ways known in the art (i.e., multiple CPUs, client-server systems, computer networking, etc.).

Figure 2:
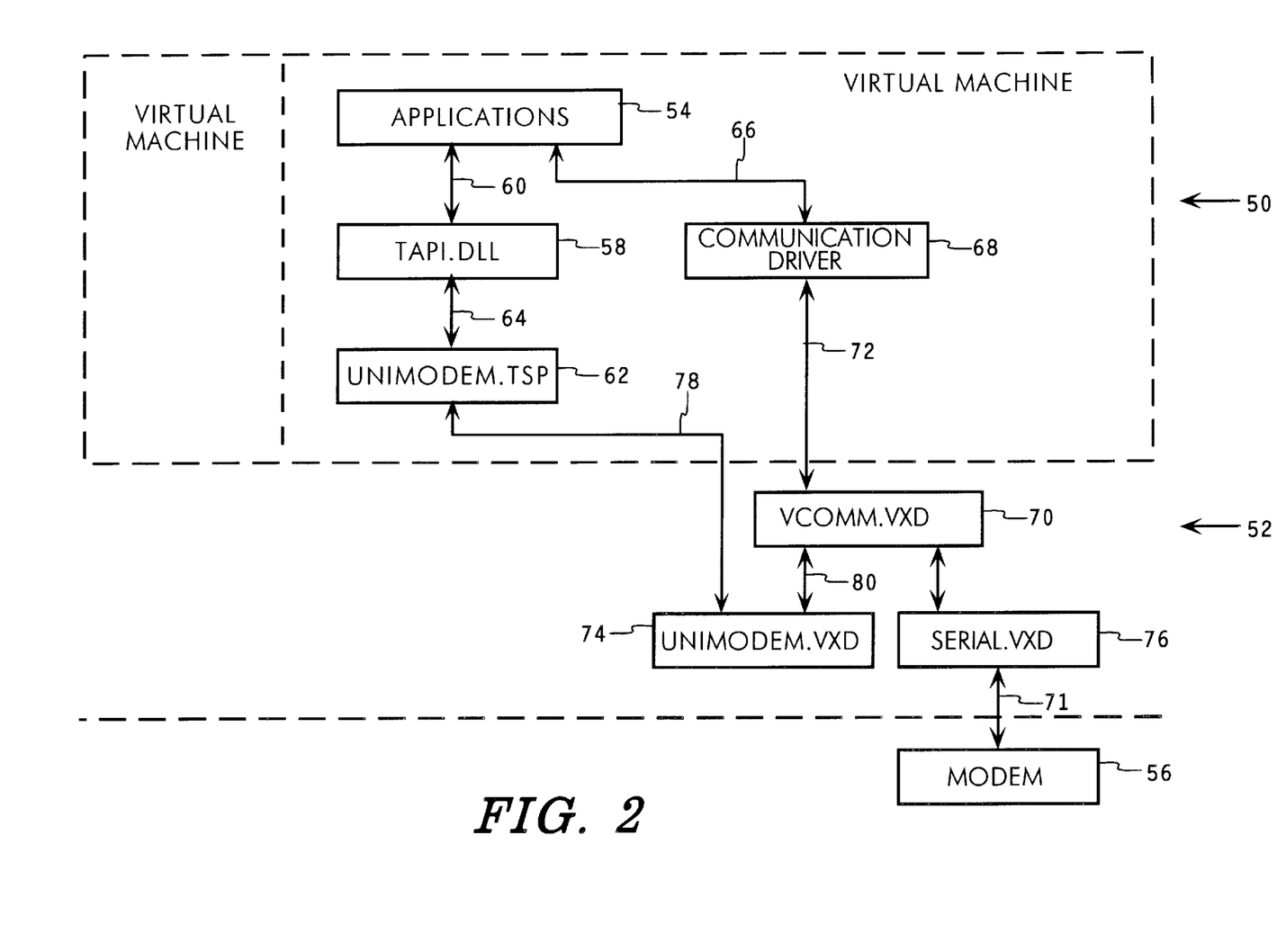
FIG. 2 is a block diagram illustrating the architecture of an embodiment of the invention within a computer system.

FIG. 2 is a block diagram illustrating the architecture of an embodiment of the invention within a computer system. This architecture depicts a modem subsystem that provides communication applications with hardware independent access to a modem installed in the computer system 20. This particular diagram depicts the specific architecture of a modem subsystem in the Windows 95 operating system developed by Microsoft Corporation of Redmond, Wash. In the architecture of the Windows 95 operating system, there are number of levels including ring 3 (50) where virtual machines such as DOS applications reside, and ring 0 (52) where virtual devices reside. While this diagram illustrates a specific example of a modem subsystem in the Windows 95 environment, it should be understood that the invention is not limited to this particular implementation. For example, the architecture of the modem subsystem can vary depending upon the type of CPU for which the operating system is designed. Many variations to the structure of the modem subsystem are possible without departing from the scope of the invention.

The modem subsystem provides support for one or more communication applications 54 requiring access to a modem 56. Communication applications 54 include remote network access, fax applications, e-mail applications, bulletin board service applications, to name a few. These and a variety of other applications require access to a modem 56 to control the modem and perform data I/O through the modem.

The Telephony Application Programming Interface (TAPI) module 58 (or "call controller") provides a device independent interface for applications to control a modem 56. In this implementation, the TAPI module 58 is a dynamic linked library (DLL). Called by applications 54 through TAPI 60, the TAPI module 58 supports such modem control functions such as dialing an outbound call, waiting for inbound calls of a particular type, answering inbound calls, hanging up current calls, etc. Additional documentation of the Telephony Application Programming Interface is attached as Appendix A "TAPI Documentation".

The TAPI module 58 routes application function calls to a service provider 62, which performs device specific control. In this modem subsystem, the service provider 62 is the unimodem service provider 62. Additional documentation on service providers is attached as Appendix B "Service Provider Documentation".

The unimodem service provider (unimdm.tsp) 62 is also a DLL implementing functions to perform control of a modem device when called by the TAPI module 58 through a telephony service provider interface 64. These modem control functions include dialing, answering, hanging-up, etc. The unimodem service provider 62 may also be called by applications to display a dialog window, allowing the user to configure modem parameters.

Though data I/O could be incorporated into the call control API, this modem subsystem provides a separate communication interface for this purpose. In the Windows 95 operating system, applications make function calls to a communication application programming interface 66 (COMM API) to configure a modem 56 and to perform data I/O through it. Additional information about the communications application programming interface is attached as Appendix C "Communications API documentation".

The modules supporting the COMM API 66 in the modem subsystem include the communication driver 68 and the virtual communication driver (VCOMM) 70. The communication driver 68 is a ring 3 level module, including functions to allow applications to open, read from, and write to communication devices. The communication driver 68 supports the COMM API 66, allowing communication applications to use a modems in a device independent fashion. In the Windows 95 Operating System, the communication driver is part of the Win32 kernel. It should be understood, however, that this is only one variation of the invention, and the communication driver can be implemented in a variety of conventional ways known to those of skill in the art.

VCOMM 70 is a ring 0 level virtual device that manages all access to communication resources in the system. These "communication resources" include physical or logical devices that provide a single asynchronous data stream. Serial ports, parallel ports, and modems are examples of communication resources.

The communication driver 68 communicates with VCOMM by calling functions (72) provided by VCOMM. VCOMM serves as a port independent interface to the communication resources in the computer system. For more information on VCOMM, see the documentation relating to VCOMM attached as Appendix D "VCOMM Documentation".

The COMM API 66 includes data I/O, user interface, and configuration functions. Applications call data I/O functions to send and receive data through a modem device 56. Through user interface functions, a user can select preferred operating characteristics of a modem. A dialog box can include modem parameters such as speaker on/off, baud rate, compression & error correction protocols, etc. Applications call configuration functions to determine or change preferred operating characteristics of a modem 56. In response to these configuration functions, the communication driver 68 routes configuration function calls to a universal modem device driver (unimodem device driver or unimodem.vxd) 74 through VCOMM 70. The functions in the COMM API, and supported in the communication driver 68, are documented Communications API attached as Appendix C.

VCOMM 70 is a port-independent interface to the communication driver 68 and the unimodem device driver 74. VCOMM 70 provides access to port drivers to carry out hardware operations on communication resources. Port drivers use VCOMM 70 services to register themselves and control access to communications hardware. In addition to these services, VCOMM 70 provides client virtual device services to enable virtual devices to use any communication resource for which a port driver is installed. Specifically, VCOMM 70 provides services for opening and closing a communications resource, configuring a communications resource, reading from and writing to a communication resource, processing communication events, and calling a port driver's extended functions.

Port drivers include device specific code to enable applications to communicate with the specific physical or logical device attached to a port. An example of a port driver is the serial port driver (serial.vxd) 76 shown in FIG. 2. The serial port driver 76 enables the modem subsystem to communicate with a serial communication device such as a modem 56 through a serial port 71. This particular serial port driver 76 is provided with the Windows Operating System, and its operation is well known. Since a modem 56 may be coupled to a computer in many different configurations, it should be understood that an alternative port driver could also be used. In this implementation, port drivers can be loaded in memory at boot time or upon demand.

As an example of on demand loading, port drivers that comply with the Plug and Play Architecture in the Windows 95 operating system are loaded when a VCOMM client attempts to open a port that the driver supports. The Plug and Play Architecture is an installation system designed for Windows operating system environments developed by Microsoft Corporation. Relevant portions of this architecture are described in detail with reference to the installation subsystem of FIG. 3. Additional documentation of the Plug and Play architecture is attached as Appendix E "Plug and Play Documentation".

In the modem subsystem illustrated in FIG. 2, a universal modem driver provides an interface for both call control functions from TAPI 60 and data transmission functions from the COMM API 66. The universal modem driver includes the telephony service provider called the unimodem service provider 62, and a VCOMM port driver called the unimodem device driver (unimodem.vxd) 74. The unimodem service provider 62 communicates with the unimodem device driver 74 by making calls to functions (78) implemented in a protected-mode interface of the unimodem device driver. The interface between the unimodem service provider 62 and the unimodem device driver 74 can be implemented in other ways using conventional techniques known to those of skill in the art.

The unimodem device driver 74 does not make direct calls to the modem 56, but rather, makes calls (80) back to VCOMM 70 to talk to the modem 56. By using VCOMM 70 as an interface to the port drivers, the unimodem device driver 74 is port independent. In this implementation, the specific port shown is a serial port driver (serial.vxd) 76, but the unimodem device driver 74 could also control a modem 56 coupled to any type of port.

The unimodem device driver 74 controls all communication with the modem 56. To accomplish this, call control as well as configuration and data I/O pass through the unimodem device driver 74. For call control, the unimodem service provider 62 calls the unimodem device driver 74 to initiate modem control commands such as dial, answer, hang up, etc. The unimodem service provider 62 passes these control calls to the unimodem device driver 74 through VCOMM using interface 78. In response, the unimodem device driver 74 translates these call control functions into a format compatible with the type of modem 56 coupled to the computer system 20. Making calls (80) back to VCOMM 70, the unimodem device driver 74 then transfers modem commands to the serial port driver 76 through VCOMM 70 in a port independent fashion.

For data transfer functions from the COMM API, the unimodem device driver 74 monitors data I/O calls. Data I/O calls originate when an application 54 calls the COMM API 66. The communication driver 68 passes these calls to the unimodem device driver 74 through VCOMM 70. The unimodem device driver 74 then passes these commands back through VCOMM 70 to the port driver 76 where the modem 56 is attached.

The unimodem device driver 74 separates the command and data modes of the modem 56 transparently. When the modem 56 is in command mode, the unimodem device driver 74 passes modem control commands to the modem 56 through the port driver 76. Conversely, when the modem 56 is in data mode, the unimodem device driver 74 passes data I/O commands to the modem 56 through the port driver 76. The unimodem device driver 74 switches between command and data mode transparently relative to the service provider 62 and the application 54. "Transparent" control means that the unimodem service provider 62 is unaware that data is being sent to the modem 56 during data mode, and the application 54 is unaware that call control commands are being sent to the modem 56 during command mode.

When the modem is command mode, COMM API functions relating to configuring and monitoring are processed. For example, if the application 54 made a call in the COMM API 66 so that it will be notified when 10 bytes of data are received, the bytes received from the modem 56 in command mode will not be counted. As soon as the modem 56 is switched to data mode and 10 bytes are received, the application 54 will be notified.

When the modem is in command mode, the unimodem device driver does not process data I/O commands from applications. The unimodem device driver can, however, process modem configuration calls from the COMM API and some escape functions relating to call control. These escape functions include functions such as initialize, dial, and listen. The initialize escape initializes the modem to the proper settings. The unimodem device driver reports when initialization is complete by notifying the TAPI module. The dial escape requests the unimodem device driver to dial a number. The unimodem device driver reports when the modem connects and when it fails to connect. The listen escape asks the unimodem device driver to answer incoming calls.

The universal modem driver 74 is capable of supporting a variety of modem types. To support a particular modem 56, there is an installation subsystem that loads device specific information into the registry. Once this information is loaded, the universal modem driver can communicate with a modem using device specific commands. This installation subsystem is described below with reference to FIG. 3.

Figure 3:
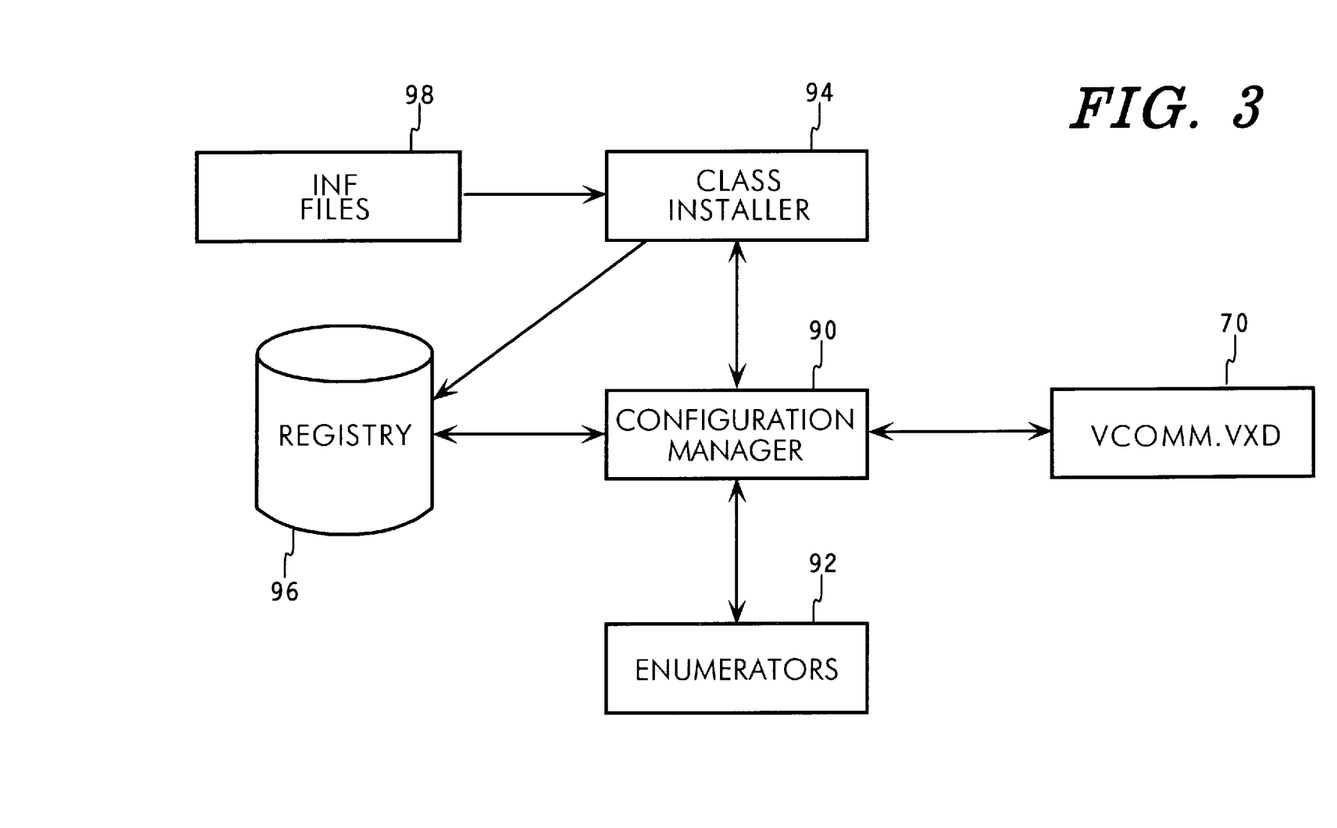
FIG. 3 is a block diagram illustrating the installer architecture according to one aspect of an embodiment of the invention.

FIG. 3 is a block diagram illustrating the installation subsystem architecture according to an embodiment of the invention. The installation subsystem includes a configuration manager 90, enumerators 92, a class installer 94, a device loader, and a registry data store 96. VCOMM 70, the virtual device discussed above, is the device loader in this subsystem.

The configuration manager module 90 is used to manage the communication resources in the system including physical devices such as modem hardware and logical devices such as communication ports. In the Windows operating system, the configuration manager 90 is a virtual device residing at ring 0. Though the specific location and manner of loading is not critical to the invention, the configuration manager 90 in this implementation is loaded at system start-up by the operating system. When the computer system 20 is turned on, the CPU performs its start-up routines. During this phase, the CPU loads the operating system, including the configuration manager 90. The configuration manager 90 learns about the system configuration by reading information in a registry 96, a data structure including configuration information. The configuration manager 90 loads enumerators to assist in identifying modem devices coupled to the computer system 20. The configuration manager 90 also performs configuration functions such as checking for resource conflicts and reporting information about devices in the system to a device loader, which in this case is VCOMM 70. If the configuration manager 90 determines that a new device has been added to the system configuration, it calls the class installer 94 to load information about the new device into the registry 96.

Enumerators 92 are detection modules used to identify devices attached to the computer system. In the Windows 95 operating system, the enumerator 92 is a virtual device residing at ring 0. At start-up, the configuration manager 90 loads one enumerator for each bus in the computer system 20. Depending on the computer system configuration, the configuration manager can load one or more enumerators, e.g. ISA , PCMCIA, PCI (Peripheral Component Interconnect, a local bus standard maintained by Peripheral Component Interconnect Special Interest Group), serial COM, etc. An enumerator 92 is used at start up to detect newly installed devices. Since some modems, such as PCMCIA compatible devices, can be loaded after start-up, an enumerator 92 is also used to detect modem devices that are attached at run time.

A newly installed modem, whether attached before or during run time, may identify itself with a device identification (ID). The device ID may be a unique number or string that identifies the type of modem 56. There are a number of alternative ways that a modem 56 may identify itself. For example, a modem can simply identify that it is connected, but not provide a specific device ID. In this case, the enumerator may be designed to read device specific information and try to match the information with data describing modem devices for which control and configuration information is stored in the computer system.

In some cases, the installation subsystem may have to query the modem to generate modem specific information and then derive a device ID from this information. This additional modem detection is discussed below in connection with the class installer 94. If the enumerator 92 successfully determines a device ID, it reports the device ID to the configuration manager 90. The configuration manager 90 then calls the class installer with the device ID so that device specific information for the new device can be loaded into the registry 96.

The registry 96 is a data structure for maintaining information about the computer system 20. In the context of modem installation, the registry 96 maintains information about the modem or modems coupled to the computer system 20. To keep track of this modem information, the registry 96 includes a series of entries specifying hardware connection information and modem control and configuration information. As modems are installed in the computer system, they are added to the registry 96. Modem information can be added to the registry 96 with the assistance of a user interface that enables a user to select and/or enter modem information. Modem information can also be added to the registry by the class installer 94.

In this embodiment, the installation subsystem behaves differently depending on whether a device complies with the Windows 95 operating system Plug and Play Architecture. In the case of a non-Plug and Play device, a user specifies information to be loaded into the registry during the installation process. This can include the user specifying information in a file to be loaded into the registry. The user can select and/or enter information through a control panel in the user interface. In addition to allowing the user to interactively select and enter modem information, the Plug and Play Architecture allows a modem to be installed without intervention by the user. In the case of Plug and Play devices, an enumerator 92 detects whether a device is coupled to a bus in the computer system. Plug and Play devices may be attached to a bus before the computer is turned on, or in some cases, may be attached to a bus at run time. In either case, the enumerator 92 reads device specific information from the bus and reports a device ID to the configuration manager 90. If the configuration manager 90 determines that the modem 56 is new, it calls the class installer 94 to load device specific information from an INF (information) file 98 to the registry.

INF files 98 include one or more script files describing the characteristics and control commands for one or more modems. INF files can be stored in secondary storage of the computer system and accessed as needed. The modem script files include a description of the modems capabilities and the AT commands needed to control the modem. After the class installer has added information from the INF file 98 for a modem, the unimodem device driver 74 can use this information in the registry 96 to properly control the modem.

Further documentation of a specific example of the INF file format and the registry entries for a modem device is attached as Appendix F "Chicago Windows Modem Development Kit". It should be understood that this information is an example only; many alternative formats for storage of device specific modem information are possible.

The class installer 94 is a dynamic linked library that can be used to identify and install modems into the computer system 20. In response to receiving a device ID, the class installer 94 loads the appropriate information from a script file into the registry 96. The class installer can load a modem script into the registry in response to a user's request. Alternatively, the class installer 94 can load device specific information to the registry without intervention by the user. If the enumerator 92 identifies the modem 56, then the configuration manager 90 passes the device ID to the class installer 94. The class installer then automatically loads the appropriate modem script into the registry.

In cases where the enumerator cannot determine the identity of a modem, the class installer can be used to detect the type of modem. The class installer 94 queries the modem by issuing a series of commands to the as yet, unidentified modem. In response to the queries, the modem responds by transmitting information about itself. Since much of the information is not useful in uniquely identifying the modem, it is cleansed from the modem response, and a 32 bit cyclic redundancy check is ultimately performed to generate a 32 bit number. The class installer 94 can then use this number to find a matching device ID corresponding to a modem script in an INF file 98.

Figure 4A:
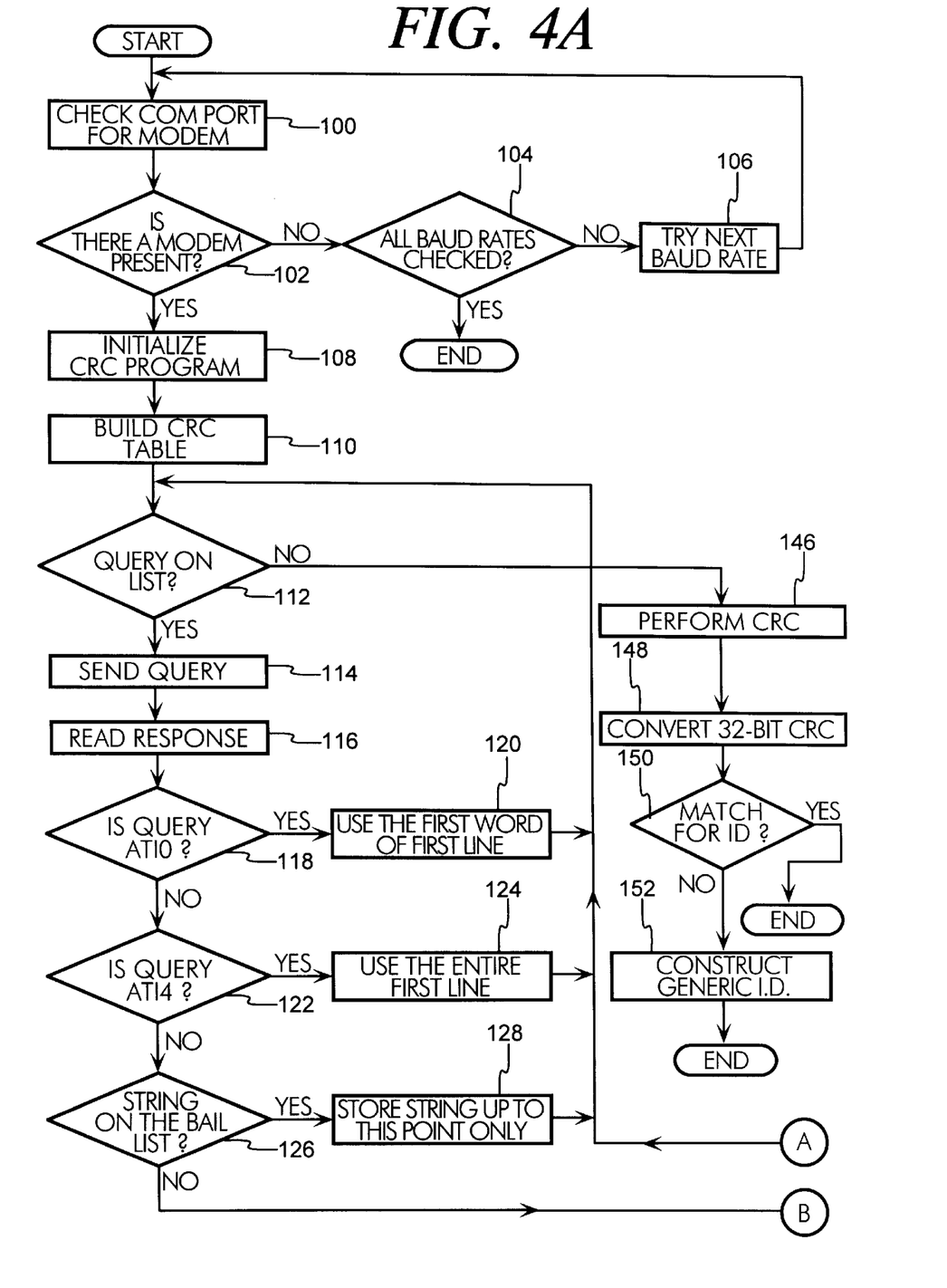
FIGS. 4A and 4B illustrate the steps performed in the installation subsystem to detect the type of modem.
Figure 4B:
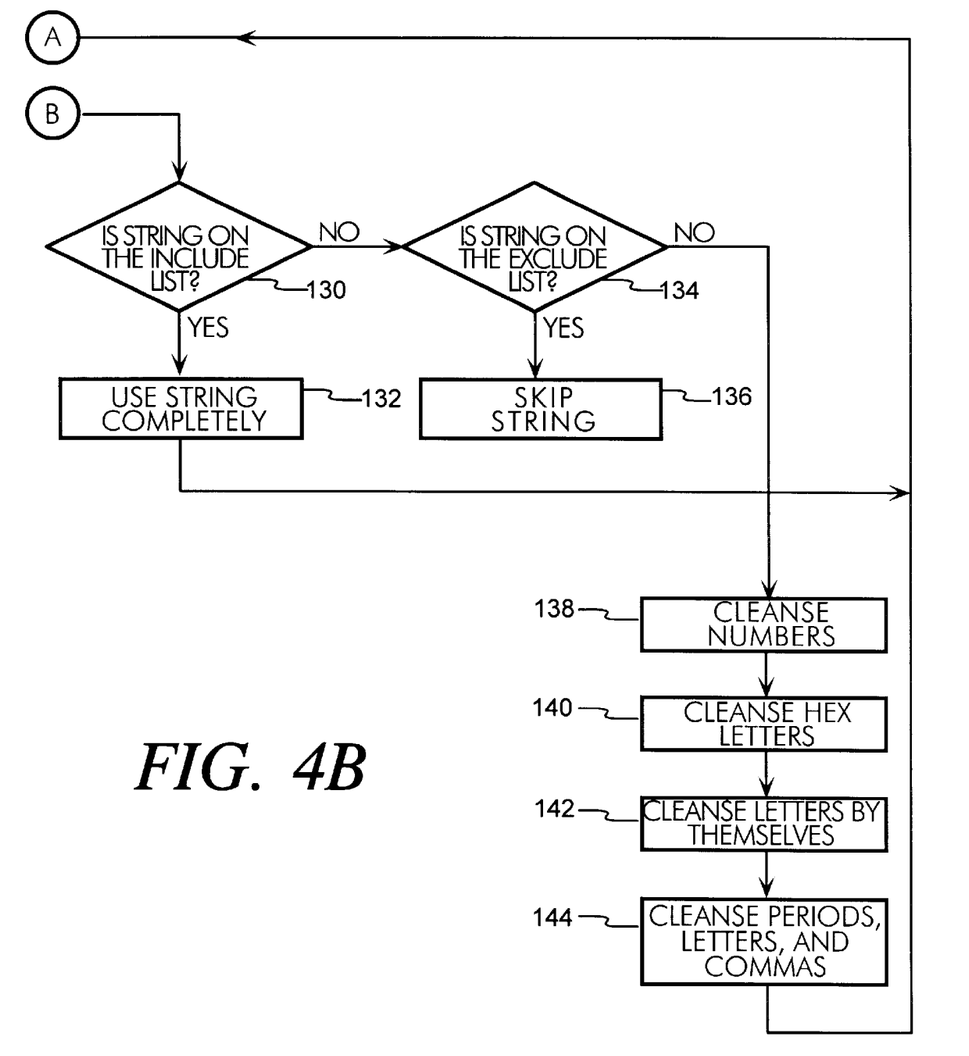

FIG. 4 illustrates the steps performed in the installation subsystem to detect the type of modem. The detection process includes checking each communication port that has a possibility of having a modem attached for the presence of a modem. To check whether a modem is present at a port, the class installer 94 first calls VCOMM 70 to open the port. VCOMM 70 then loads the port driver 76 for the port to establish communication between the class installer 94 and the port. The steps of opening a port and establishing communication using VCOMM 70 are documented in the VCOMM API available from Microsoft Corporation.

Once communication is established, the class installer 94 issues a query to determine if a modem is connected (100, 102). This query is ATE0Q0V1, a standard series of commands from the AT command set. Literally, the query means: echo off (E0), give responses (Q0), provide responses in verbose form (V1).

The class installer 94 issues the initial query four times at each of the standard baud rates (104, 106). These rates include 9600, 2400, 1200, and 300. If a modem is detected at a particular baud rate, then the class installer 94 proceeds to the next step. Otherwise, the class installer 94 moves on to the next communication port and repeats the initial query.

If a modem is detected, the class installer attempts to build a device ID. The next step shown in FIG. 4 is the step of initializing the cyclic redundancy check program (108). It is not critical that the initialization be performed specifically at this step. It should, however, be performed before the CRC calculation is made to generate the device ID. In this particular embodiment, the CRC table is built on the fly. This form of CRC improves performance because it avoids the need to maintain a static copy of the CRC table. A variety of CRC programs could be used in place of this type of CRC program, but this type of CRC program is preferred. Since the CRC table is created on the fly, the CRC program is initialized early in the process. The next step of building a CRC table is shown as the next step 110, but it should be understood that this step 110 is actually occurring on the fly.

The next two steps 112, 114 in FIG. 4 represent the process of issuing a query on the query list. Table 1 below lists the queries on the list.

TABLE 1

Query List:

| "ATI0\r", | "ATI1\r", | "ATI2\r", | "ATI3\r", |
|---|---|---|---|
| "ATI4\r", | "ATI5\r", | "ATI6\r", | "ATI7\r", |
| "ATI8\r", | "ATI9\r", | "ATI10\r", | "AT%V\r" |

Each of the commands in Table 1 instruct the modem to query its memory for information about itself and then return the information.

After issuing a query the class installer then reads the response (116). The response is then cleansed according to the type of query. If the query is ATI0 (118), then only the first word of the first line is used (120).

If the query is ATI4 (122) and the response string matches an I4 standard as set forth in the Hayes AT Command Set, then the complete first line is used (124).

For all other queries, the following cleansing is performed on the first line:

If a string is on the bail list shown in Table 2 below (126), then use only the portion of the string up to the string in the bail list (128).

TABLE 2

Bail list:

| "CONNECT", | "RING", | "NO CARRIER", | "NO DIALTONE", |
|---|---|---|---|
| "BUSY", | "NO ANSWER", | "=" | |

If a string is on the include list shown in Table 3 below and is not surrounded by numbers (130), then the complete string is used (132).

TABLE 3

Include list:

| "300" | | | |
|---|---|---|---|
| "1200", | | | |
| "2400", | | | "2,400", |
| "9600", | "96", | "9.6", | "9,600", |
| "12000", | "120", | "12.0", | "12,000", |
| "14499", | "144", | "14.4", | "14,400", |
| "16800", | "168", | "16.8", | "16,800", |
| "19200", | "192", | "19.2", | "19,200", |
| "21600", | "216", | "21.6", | "21,600", |
| "24000", | "240", | "24.0", | "24,000", |
| "26400", | "264", | "26.4", | "26,400", |
| "28800", | "288", | "28.8", | "28,800", |
| "31200", | "312", | "31.2", | "31,200", |
| "33600", | "336", | "33.6", | "33,600", |
| "36000", | "360", | "36.0", | "36,000" |
| "38400", | "384", | "38.4", | "38,400", |
| "9624", | "32bis", | "42bis", | "V32", |
| "V.32", | "V.FC", | "FAST", | "FAX", |
| "DATA", | "VOICE" | | |

If a string is on the exclude list shown in Table 4 below (134), then the string is skipped (136).

TABLE 4

Exclude list:

| "JAN", | "FEB", | "MAR", | "APR", | "MAY", | "JUN", |
|---|---|---|---|---|---|
| "JUL", | "AUG", | "SEP", | "OCT", | "NOV", | "DEC" |

If none of the previous steps is satisfied for a string in the first line, then the string is cleansed as follows:

1) Remove all numbers (138);
2) Remove all hex letters not adjoined by non-hex letters (140);
3) Remove all letters by themselves (142);
4) Remove all periods, commas, and spaces (144).

After all of the queries on the list in Table 1 have been issued, then a cyclic redundancy check is computed for each character or number in the cleansed response (146). The result of the CRC is a 32 bit number. The 32 bit CRC is then converted to a ASCII string representing the device ID in the form "UNIMODEMxxxxxxxx" (148).

The class installer 94 then must search a list of device IDs for which device information is included in an INF file 98. If a match is found (150), then the class installer can load the appropriate script in the registry 96.

If no match exists, however, a generic ID is used (152). The generic ID is used in situations where the modem subsystem is aware that a modem is connected, but cannot specifically identify the modem and/or cannot find a matching device ID. The generic device ID is associated with generic modem control information in an INF file. This generic modem control information is based on commands that are most likely compatible with a wide variety of modems. The generic control information can be tailored to the specific modem connected. For example, the modem can be queried to determine the maximum DTE rate. In addition, an approximate DCE rate can be determined based on the response to the ATI0 query.

Having described the architecture and operation of both the modem subsystem and the installation subsystem, it is now appropriate to illustrate the operation of the embodiment with an example.

The first phase of the process is installation of a modem into the computer system. The installation phase includes identifying the modem and then loading the modem specific information into the registry 96. The second phase of the process involves using the modem independent interface to control and perform data I/O with the modem. The following example relates to a PCMCIA compatible modem device. It should be understood that other installation configurations are possible depending on the type of modem, i.e. external, internal, and the type of physical and logical communication port involved.

For a typical PCMCIA device, installation begins when a user inserts a PCMCIA card into a PCMCIA card slot coupled to a PCMCIA bus in the computer system 20. A user may insert the device either before starting the computer or during run time.

If the user installs the PCMCIA before start up, an enumerator 92 loaded for the bus at start up will attempt to detect the device and report its device ID to the configuration manager 90. In the case of a PCMCIA device, there is an enumerator 92 to detect and report PCMCIA devices attached to the PCMCIA connector. Similarly, if the user inserts the device at run time, an enumerator 92 performs similar detecting and reporting steps. If the enumerator 92 can identify the device, it passes the device ID to the configuration manager 90.

Next, the configuration manager 90 reads the device ID and recognizes that the modem is a new device in the system. The configuration manager determines whether the modem is a new device by checking the registry 96 for a listing of the device.

In cases where the modem is not programmed to identify itself to an enumerator 92, the class installer 94 attempts to generate a device ID. The configuration manager 90 calls the class installer 94 to run the detection program described in detail above.

Once a device ID is determined, the configuration manager 90 calls the class installer 94 with the device ID. The class installer 94 finds the appropriate INF file 98 based on the device ID and copies INF file information into the registry 96. The class installer 94 also reports the PCMCIA modem as a new line device to the TAPI module 58.

After updating the registry 96, the class installer 94 informs the configuration manager 90 that the new modem 56 is installed. The configuration manager 90 then reads the registry 96 to determine the device loader. In this implementation, VCOMM 70 is the device loader, and is identified as such by an entry in the registry 96 (e.g. deviceloader=vcomm.vxd). As the device loader, VCOMM 70 performs the loading of the appropriate drivers to establish communication with the modem as set forth below.

The configuration manager 90 gives the device loader (VCOMM) 70 a pointer, identifying the modem device and the communication resources associated with it. Specifically, the configuration manager 90 tells VCOMM 70 about the driver or drivers servicing the modem such as the unimodem device driver 74 and the serial port driver 70. At this point, the modem 56 is installed and ready to be accessed by an application.

When the application 54 wants to establish communication with a modem 56, it begins by querying the TAPI module 58 for line devices. The TAPI module returns the modem's identification, a number identifying the modem. The application 54 then opens communication with the modem 56 by making a call to the TAPI module 58 specifying modem identification of the modem to be "opened."

In response to this call from the application 54, the TAPI module 68 calls the unimodem service provider 62 to open the modem device. The unimodem service provider 62 then calls VCOMM 70 to open the port.

When VCOMM 70 receives a call to open the modem by its name, it loads the unimodem device driver 74. VCOMM 70 knows to load the unimodem device driver 74 because the device name is associated with the device driver in the registry 96, and the device driver is identified as the unimodem device driver.

The unimodem device driver 74 then requests VCOMM 70 to open the port associated with the modem. In response, VCOMM 70 loads the appropriate port driver (e.g. the serial port driver 76, serial.vxd).

From this point on, the application makes control calls through the TAPI module 58 to control the modem 56 (i.e. dial a number, wait for an inbound call, etc.). The TAPI module 58 passes these control calls to the unimodem service provider 62, which translates them into the lower level calls of the unimodem device driver 74. Using information in the registry 96, the unimodem device driver 74 initializes the modem 56 as appropriate to prepare the modem for a call.

The application 54 can now make calls to the TAPI module 58 to control a telephone connection through the modem. Once a connection is established with another modem, the TAPI module 58 informs the application about the connection.

Though the invention is described above with reference to a particular embodiment, it should be understood that many variations to the embodiment are possible without departing from the scope of the invention. For example, the structure of the TAPI module and the communication driver could be altered and yet still provide the same interface to applications. Many aspects of system architecture are based on a specific architecture of the Windows 95 system, but it should be understood that the specific architecture can vary. For example, other systems may not have separate "ring 3" and "ring 0" levels that are known for a Windows Operating System. The unimodem service provider and unimodem device driver may be combined in some systems. At a lower level, it is not required that there be a port independent interface such as VCOMM, and similarly, the unimodem device driver need not be a VCOMM port driver. The functions provided by the enumerator, device loader, and class installer can be provided in different modules and be loaded in various ways in the system. In short, many variations are possible.

In view of the many possible embodiments to which the principles of our invention may be put, it is emphasized that the detailed embodiments described herein are illustrative only and should not be taken as limiting the scope of our invention. Rather, we claim as our invention all such embodiments as may come within the scope and spirit of the following claims and equivalents thereto.

APPENDICES

Forming a part of the present specification are the following attached, in the file wrapper but will not be printed, appendices:

Appendix A "TAPI Documentation": Chapter 1—Line Device Functions; Chapter 12—Line Device Data Structures; Chapter 13—Line Device Constants; and "Implementation of Windows Telephony in Windows 95"

Appendix B "Service Provider Documentation": Chapter 6—Service-Provider Functions; Chapter 7—TSPI Line-Related Functions; Chapter 8—TSPI Line-Related Messages; Chapter 9—TSPI Data Types; Chapter 10—TSPI Line-Device Data Structures; Chapter 11—TSPI Line-Device Constants; and Chapter 11—Line Device Messages Appendix C "Communications API Documentation": Chapter 68—Communications; "Chicago Win32 Communications API Modem Configuration Extensions"

Appendix D "VCOMM Documentation": Chapter 1—Communications Overview; Chapter 2—Virtual Communications Driver; and Chapter 3—Communications Port Drivers Appendix E "Plug and Play Documentation"

Appendix F "Chicago Windows Modem Development Kit"

(Copyright in the appendices is maintained by Microsoft Corporation).

We claim:

1. A device independent modem interface for one or more application programs executing in a computer, the interface comprising:

a registry data store for storing modem specific control information;

a call controller for receiving modem independent call control commands from the application programs to control a modem;

a communication driver for receiving modem independent data I/O commands from the application programs to transfer data through the modem; and a universal modem driver in communication with the registry data store for reading modem specific control information for the modem, the universal modem driver in communication with the call controller for receiving modem independent call control commands and in communication with the communication driver for receiving modem independent data I/O commands, the universal modem driver in communication with the modem for translating the modem independent call control commands to modem specific control commands based on the modem specific control information in the registry data store.

2. The device independent modem interface of claim 1 wherein the universal modem driver distinguishes a command mode and a data mode of the modem such that when the modem is in command mode, the universal modem driver transfers call control commands from the call controller to the modem, and when the modem is in data mode, the universal modem driver transfers data I/O commands to the modem, wherein the universal modem driver switches between the command mode and the data mode such that the communication driver continues to process data I/O commands from the applications while in command mode, and the call controller continues to process call control commands from the applications while in data mode.

3. The device independent modem interface of claim 1 wherein the registry data store is in communication with a class installer for determining modem type and for loading an information file corresponding to the modem type from secondary storage into the registry in memory of the computer, wherein the information file includes all of the modem specific control information used by the universal modem driver to control the modem.

4. The device independent modem interface of claim 1 further comprising a port driver interface for performing data communication with one or more port drivers, wherein the universal modem driver is in communication with the port driver interface for communicating with one of the one or more port drivers independent of port driver type.

5. The device independent modem interface of claim 1 wherein the call controller and the communication driver are incorporated into one module and provide an application programming interface accessible to the application programs executing in the computer.

6. The device independent modem interface of claim 1 wherein the call controller and the communication driver are separate modules and each provide an application programming interface accessible to the application programs executing in the computer.

7. The device independent modem interface of claim 6 wherein the call controller is a dynamic link library comprising executable instructions.

8. The device independent modem interface of claim 6 wherein the communication driver is a dynamic link library comprising executable instructions.

9. The device independent modem interface of claim 1 further including a class installer for issuing modem detection commands to the modem, for receiving modem specific identification information from the modem, and for generating a device ID based on the modem specific identification information.

10. A method for communicating through a modem in a computer system having a call controller and a communication driver accessible to one or more application programs, a universal modem driver for transferring modem specific commands to a modem, and a registry data store for storing modem specific control information, the method comprising:

reading modem specific control information from the registry data store with the universal modem driver so that the universal modem driver can issue modem specific control commands to the modem in the computer system;

receiving call control commands from the one or more application programs in the call controller;

receiving data I/O commands from the one or more application programs in the communication driver;

in response to receiving the call control commands in the call controller, issuing call control commands to the universal modem driver;

in response to receiving the data I/O commands in the communication driver, issuing data I/O commands to the universal modem driver;

when the modem is in command mode, transferring modem specific control commands to the modem with the universal modem driver, continuing to issue at least a first data I/O command from the communication driver to the universal modem driver, and deferring processing of the at least first data I/O command received by the universal modem driver while in command mode until the modem switches to data mode such that the application programs do not need to be aware that the modem is in command mode or data mode;

and when the modem is in data mode, transferring data I/O commands to the modem through the universal modem driver, continuing to issue at least a first call control command from the call controller to the universal modem driver, and deferring processing of the at least first call control commands received by the universal modem driver while in data mode until the modem switches to command mode such that the call controller does not need to be aware that the modem is in command mode or data mode.

11. The method of claim 10 wherein the computer system further includes a class installer in communication with the registry data store for loading modem specific control information from a modem information file into the registry data store and an enumerator detection module in communication with the modem for detecting modem type; and the method further includes:

when a modem is connected to a bus of the computer system, detecting the modem type with the enumerator detection module;

in response to detecting modem type, specifying the modem type to the class installer;

and in response to receiving the modem type in the class installer, loading modem specific control information into the registry data store with the class installer.

12. The method of claim 11 wherein the detecting step includes reading modem identification information from the modem, and the identifying step includes reporting a device ID based on the modem identification information to the class installer.

13. The method of claim 10 wherein the computer system has a class installer in communication with the modem for detecting modem type; and further including the steps of:

issuing a series of queries to the modem with the class installer;

receiving the modem responses to the series of queries;

determining which portion of the modem responses to save depending on the query issued of the series of queries to derive modem specific response data;

converting the modem specific response data to a unique device ID;

attempting to find a match for the unique device ID;

and if a match for the unique device ID is found, loading modem specific control information corresponding to the unique device ID into the registry data store.

14. The method of claim 10 wherein the computer system has a configuration manager in communication with the registry data store, and a device loader for loading the universal modem driver; and further including the steps of:

reading the registry data store with the configuration manager to determine the device loader; and     when an application program issues a command to the call control module to establish communication with the modem, loading the universal modem driver into main memory from secondary storage with the device loader.

15. The method of claim 10 wherein the step of receiving call control commands from the one or more application programs comprises receiving modem independent call control commands from the one or more application programs.

16. A method for controlling communication through a modem in a computer including a call controller for receiving call control commands from plural application programs executing in the computer, and a universal modem driver, the method comprising:

querying the modem to detect the modem type;

in response to detecting the modem type, loading modem specific control information associated with the modem type;

receiving modem independent call control commands from the plural application programs in the call controller;

issuing the modem independent call control commands to the universal modem driver; and     translating the modem independent call control commands to modem specific call control commands in the universal modem driver using the modem specific control information associated with the modem type.

17. The method of claim 16 wherein the computer includes a communication driver for receiving data I/O commands from the application programs executing in the computer; and wherein the method further includes:

receiving data I/O commands from the application programs in the communication driver;

issuing the data I/O commands to the universal modem driver;

while the modem is in data mode, issuing the data I/O commands to the modem from the universal modem driver, and continuing to issue at least a first call control command to the universal modem driver from the call controller, and deferring processing of the first call control command received by the universal modem driver until the modem is in command mode.

18. The method of claim 16 further including:

while the modem is in command mode, issuing the modem specific call control commands to the modem, continuing to issue at least a first data I/O command to the universal modem driver from the communication driver, and deferring processing of the first data I/O command received by the universal modem driver until the modem is in data mode.

* * * * *